United States Patent [19]
Francombe et al.

[11] 3,774,174
[45] Nov. 20, 1973

[54] POLARIZATION AND OPTICAL SWITCHING OF QUADRISTABLE FERROELECTRIC FILMS BY SINGULAR ELECTRODES

[76] Inventors: Maurice H. Francombe, 2600 Hollywood Dr.; Shu Y. Wu, 1115 Graham Blvd.; William J. Takei, 140 Calmont Dr., all of Pittsburgh, Pa. 15235

[22] Filed: Aug. 10, 1972

[21] Appl. No.: 279,568

[52] U.S. Cl. .................. 340/173.2, 340/173 LT
[51] Int. Cl. ............................. G11c 11/22
[58] Field of Search ...................... 340/173.2

[56] References Cited
UNITED STATES PATENTS
3,602,904   8/1971   Cummings .................. 340/173.2

*Primary Examiner*—Terrell W. Fears
*Attorney*—F. Shapoe et al.

[57] ABSTRACT

A quadristable ferroelectric device comprises a ferroelectric material with at least two independently reversible polarization components and single-crystal domains. At least one set of electrodes are positioned to apply electric fields to single-crystal domains of the ferroelectric material at such angle to said reversible polarization components that a first electric field can ferroelectrically polarize and repolarize both said reversible polarization components and a second electric field can reverse one said reversible polarization component without reversing the other said reversible polarization component. Preferably, the ferroelectric material of the quadristable ferroelectric device is (010) crystallographically oriented bismuth titanate and the angle of the set of electrodes is between about 30° and 60° and most desirably between about 40° and 50° to the *a* and *c* crystallographic axes of the single-crystal domains. Further, it is preferable that each set of electrodes comprise three elongated electrodes parallel to and spaced apart from each other with the driving potential to apply the electric field applied at either the center or the pair of outer electrodes.

9 Claims, 7 Drawing Figures

Scale:
Vertical = 4.15 μC/cm² per large division
Horizontal = 19.7 kV/cm per large division Scale:
Vertical = 32.7 μC/cm² per large division
Horizontal = 39.4 kV/cm per large division Scale:
Vertical = 8.5 μC/cm² per large division
Horizontal = 40 kV/cm per large division

POLARIZATION AND OPTICAL SWITCHING OF QUADRISTABLE FERROELECTRIC FILMS BY SINGULAR ELECTRODES

GOVERNMENT CONTRACT

The present invention was made in the course of or under U.S. Government Contract No. F 33615-7-1-C-1268.

FIELD OF THE INVENTION

This invention relates to polarization and optical switching of quadristable ferroelectric films and particularly epitaxially grown bismuth titanate films.

BACKGROUND OF THE INVENTION

Quadristable ferroelectrics are ferroelectric materials where the resultant polarizing electric field vector in the single-crystal domains thereof lies in any one of four quadrants. This results from the fact that at least two of the electric field components are independently reversible. Interest usually centers on switching the smaller of the independently reversible components. Polarization of the material requires, however, that all components of the electric field be poled and sometimes repoled during subsequent operations. Poling-repoling and switching were previously performed by separate sets of electrodes.

Single-crystal bismuth titanate ($Bi_4Ti_3O_{12}$) is a quadristable ferroelectric which has become of particular interest because of its unique electrical-optical behavior. It has two independently reversible polarization components along the monoclinic $a$ and $c$ axes. A small 4 $\mu C/cm^2$ component lies along the $c$ axis and has a threshold coercive field of about 3 to 3.5 kV/cm. A large, approximately 50 $\mu C/cm^2$, component lies along the $a$ axis and has a threshold coercive field of about 50 kV/cm. Thus, the resultant polarization vector lies in the monoclinic a-c plane making a small angle (about 4.5°) to the $a$ axis.

The interest in bismuth titanate results from its optical switching behavior. It has been found that in single-crystal domains of bismuth titanate the axis of the optical indicatrix, which is also in the monoclinic a-c plane of the crystal, can be rotated through about 50° simply by reversing the $c$ polarization component by an electric field parallel to the crystallographic $c$ axis; see S. E. Cummins and L. E. Cross, "Electrical and Optical Properties of Ferroelectric $Bi_4Ti_3O_{12}$ Single Crystals," J. Appl. Phys. 39, 2268 (April, 1968). On switching the component of the electric field along the $c$ axis, a resultant change of 40° in the extinction positions of the orthogonal light polarization axes and in turn a near-optimum change in the intensity of the transmitted light occurs. Thus, if a bismuth titanate crystal is oriented to be in an extinction position when viewed along the $b$ axis through crossed polarizers, it will not transmit light until the polarization field component along the $c$ axis is switched by an electrical signal which changes the extinction position so that the crystal is set for essentially optimum transmission. This property makes bismuth titanate crystals uniquely suited for high-contrast display systems and optical memory systems; see S. E. Cummins, Proc. IEEE, 55, 1536, 1537 August, 1967) and U.S. Pat. No. 3,374,473.

The bismuth titanate used should be in a single domain state so that uniform optical switching results. The bismuth titanate crystal must be uniformly polarized in both $c$ and $a$ components of the single domain region. Achievement of uniformity in switching is no problem as the small magnitude polarization component along the $c$ axis can be easily reversed. However, poling the polarization component along the $a$ axis presents a difficult problem. Not only is the threshold potential for polarization of the $a$ polarization component high, ~50 kV/cm, but the electrodes used for this poling cannot be used for $c$ component switching. Sequential electroding has therefore been used wherein the $a$ polarization uniformity is achieved by $a$ axis-oriented electrodes, those electrodes removed, and $c$ axis-oriented electrodes positioned for application of the $c$ polarizaion component and switching. Moreover, while these steps could be followed in fabrication, a more fundamental problem arises from another property of the material. It has been found that after many $c$ axis polarization reversals by switching, the $a$ polarization component degrades. To correct this effect, it is necessary to disassemble the device, remove the switching electrodes, and cycle through the electroding sequence anew.

The present invention overcomes these difficulties and disadvantages. It permits a singular set of permanent electrodes to be used for initial polarization, subsequent switching and routine correction for any depolarizing effects. Moreover, it provides for a new electrode matrix in which fewer electrodes and more of the bismuth titanate crystal can be utilized for optic switching.

SUMMARY OF THE INVENTION

A quadristable ferroelectric device is provided with a ferroelectric material having at least two independently reversible ferroelectric polarization components and single domain regions. At least one set of electrodes is attached to said ferroelectric material to apply electric fields through said single domain regions of the ferroelectric material at an angle to said reversible polarization components. The angle of application of the electric fields is selected so that a first electric field can ferroelectrically polarize both said reversible polarization components and a second electric field can reverse one said reversible polarization component without reversing the other reversible polarization component.

The optimum angle of application of the electric fields will vary with the electrically conductive properties of the ferroelectric material and the relative magnitudes and angles of the reversible ferroelectric components. For example, if the ferroelectric material has anisotropic electrical conductivity, the electrodes will be positioned to favor one reversible polarization component or the other depending on the relative magnitudes of the independently reversible polarization components and the direction of anisotropy; or, if the ferroelectric has isotropic electrical conductivity and the reversible polarization components are of equal magnitude along orthogonal axes, the electrode will be positioned to favor one component or the other depending on which reversible component is to be reversed during switching.

Preferably, bismuth titanate is the ferroelectric material. The reversible polarization along the crystallographic $a$ axis of the single domain regions are aligned so the material will exhibit optical switching when the ferroelectrical polarization is reversed in the $c$ axis direction by the electric fields. It is preferred that the bismuth titanate be epitaxially grown on a (110) crystallographically oriented spinel crystal substrate as fully desirable in our co-pending U.S. Pat. application Ser. No. 279,563 filed Aug. 10, 1972 to form a film having untwinned, (010) crystallographically oriented single-crystal domains. The electric field applied by each set of electrodes is preferably at angles between about 30° and 60° and most desirably at angles between about 40° and 50° to the $a$ and $c$ crystallographic axes of the single-crystal domains of the bismuth titanate film.

More preferably, each set of electrodes comprises three elongated electrodes positioned parallel to and spaced from each other. The driving potential is applied to either the centrally positioned electrode or simultaneoulsly to the outwardly positioned electrodes so that the electric fields through the ferroelectric material is in opposite directions between the electrodes of the set of electrodes. Most desirably the driving potential is applied to the centrally positioned electrode by applying a photosensitive electrically conductive layer to said centrally positioned electrode and applying thereover a translucent electrode. The driving potential is thus applied to the centrally positioned electrodes of at least one set of said electrodes when the photosensitive material is light activated to permit electrical conduction therethrough.

Other details, objects and advantages of the invention will become apparent as the following description of the present preferred embodiments and the present preferred methods of practicing the same proceeds.

BRIEF DESCRIPTION OF THE DRAWINGS

In the accompanying drawings, the present preferred embodiments of the invention and present preferred methods of practicing the invention are illustrated in which.

DESCRIPTION OF THE PREFERRED EMBODIMENTS

A quadristable ferroelectric device of the present invention is described by reference to the schematic of FIG. 1. The ferroelectric material is preferably a (010) crystallographically oriented epitaxially grown bismuth titanate. ($Bi_4Ti_3O_{12}$) crystal film. The set of electrodes consists of electrodes 10 and 11 oriented at about 45° to both the $c$ and $a$ crystallographic axes.

Figure 1:
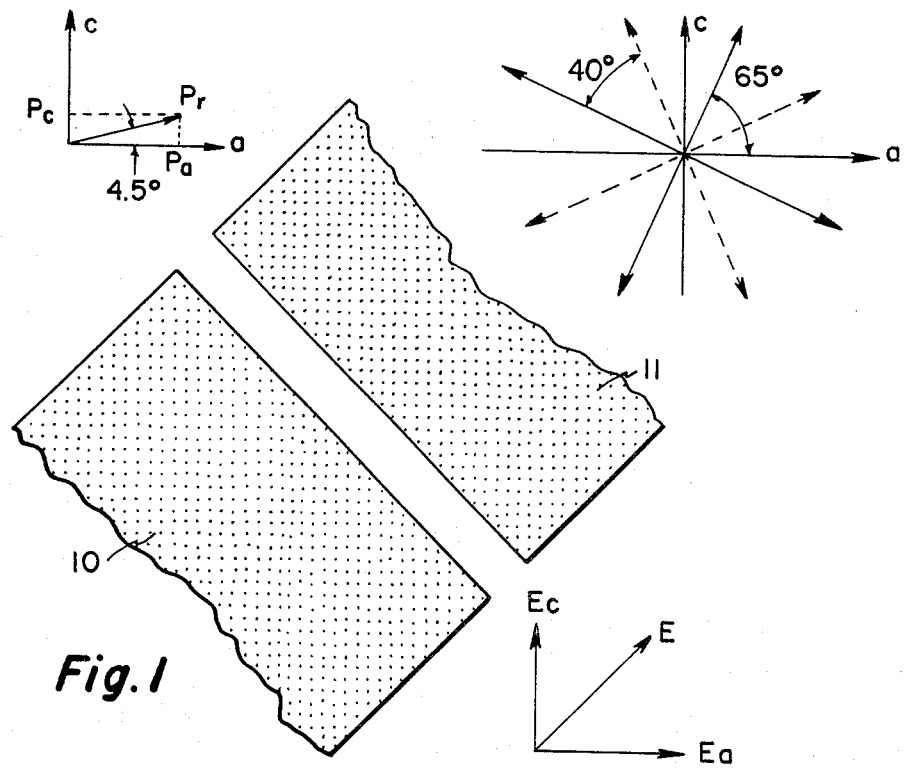
FIG. 1 is a schematic showing the electrodes of the present invention and their induced electric field in relation to the monoclinic plane, ferroelectric polarization and light polarization of a bismuth titanate crystal.

The position of the ferroelectric polarization vector relative to the $c$ and $a$ crystallographic axes of the ferroelectric material and the electric field applied through the ferroelectric material is shown by FIG. 1. The ferroelectric polarization vector lies in the monoclinic a-c plane of the bismuth titanate film at a small angle of about 4.5° to the a axis. Since both the $a$ and $c$ components of the ferroelectric polarization are independently reversible, FIG. 1 illustrates only one of four possible directions for the resultant polarization vector in any of the four quadrants in the a-c crystallographic plane.

FIG. 1 also illustrates the light polarization relative to the $a$ and $c$ crystallographic axes as viewed along the $b$ axis. When viewing a single domain region of the bismuth titanate film, the optical indicatrix is oriented so that the light extinction directions are as indicated by the solid cross arrows of FIG. 1. If the ferroelectric polarization components along the $c$ crystallographic axis ($P_c$) is reversed by application of the appropriate electric field ($\vec{E}$), the light extinction directions are changed to the positions indicated by the dotted crossed arrows. The net result is a rotation of the extinction positions by 40° upon reversing of the $c$ axis component of ferroelectric polarization. Thus, if a crystal is oriented in the extinction position, it will not transmit light until the $c$ axis polarization component is switched by the electric field.

The principle of this device (cf. FIG. 1) is that, assuming approximately isotropic conductivity in the film plane of the bismuth titanate (which is present at lower temperatures) there will be components of the applied field $\vec{E}$ with component magnitudes of approximately $E/\sqrt{2}$ along the $a$ and $c$ axis directions ($E_a$ and $E_c$). Since the electric field required for switching the $a$ axis polarization component was considerably larger than that needed for the $c$ axis component, as discussed supra, once the film is polarized with a large initial electric field for both $a$ and $c$ components ($E_a$ and $E_c$) subsequent application of smaller fields will switch the $c$ component while leaving the $a$ component unchanged. If the $a$ axis component depoles, the large initial electric field can be reapplied which will soon bring the film to the initial polarized condition without going through the time-consuming sequential electroding process of the prior art.

Figure 2:
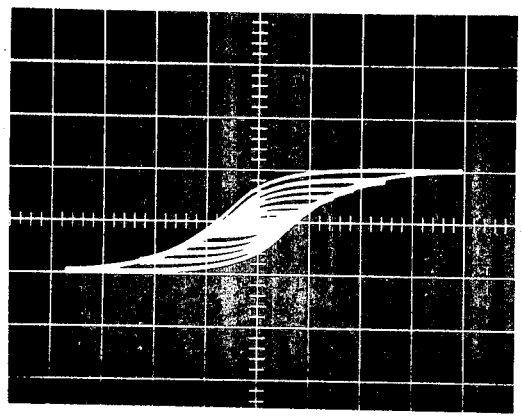
FIG. 2 is an oscilloscope photograph of hysteresis loops developed by applying a potential to a bismuth titanate crystal along the crystallographic $c$ axis.
Figure 3:
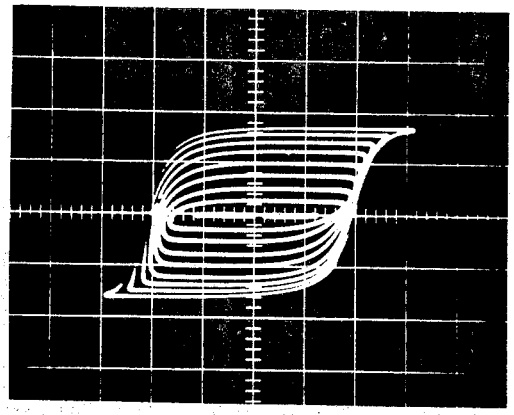
FIG. 3 is an oscilloscope photograph of hysteresis loops developed by applying a potential to a bismuth titanate crystal along the crystallographic $a$ axis.
Figure 4:
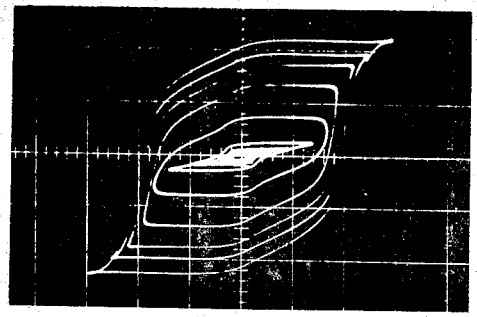
FIG. 4 is an oscilloscope photograph of hysteresis loops developed by applying a potential to a bismuth titanate crystal at a 45° angle to both the $a$ and $c$ axes.

The ferroelectric device utilizing bismuth titanate ferroelectric material has been operated successfully as shown by reference to FIGS. 2 through 4. These Figures show the step-by-step opening of hysteresis loops obtained from single domain epitaxially grown bismuth titanate films. FIG. 2 shows the hysteresis loops obtained by applying electric fields along the $c$ axis. The polarization is seen to approach saturation at an electric field of about 50 kV/cm. FIG. 3 shows the loops obtained when electric fields were applied along the $a$ crystallographic axis; at electric fields up to about 50 kV/cm no switching occurred. Above about 50 kV/cm, switching of the $a$ polarization component began.

FIG. 4 shows the hysteresis loops obtained by applying an electric field with electrodes angled at 45° to the $a$ and $c$ crystallographic axes. Up to about 50 kV/cm, the amount of switched ferroelectric polarization was small, but large increases were observed by applying larger electric fields, indicating no $a$ polarization component was being switched at the lower fields.

Figure 5:
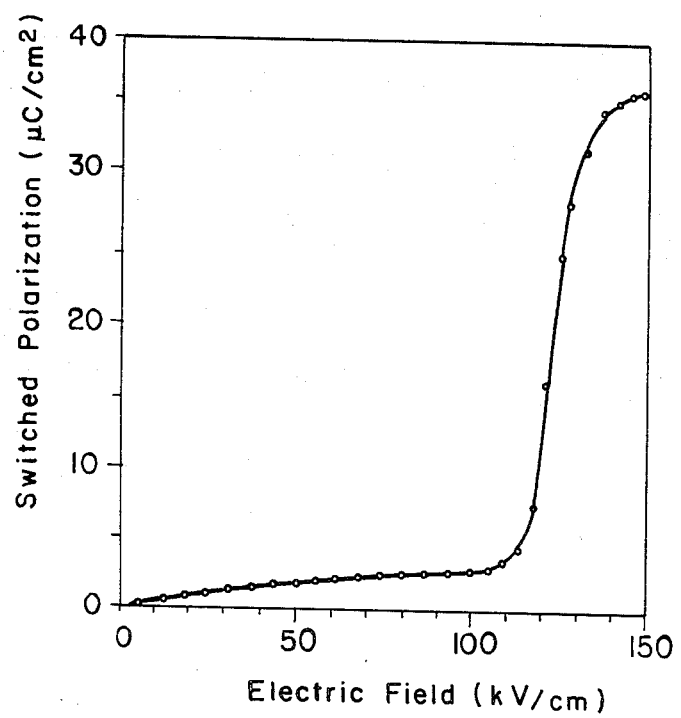
FIG. 5 is a graph showing switched ferroelectric polarization of a bismuth titanate crystal as a function of reversing electric field applied by electrodes positioned at a 45° angle to both the $a$ and $c$ axes.

The effect is illustrated graphically in FIG. 5 which shows a plot of switched polarization vs. switching electric field for the 45° configuration. An abrupt increase in the amount of switched polarization occurs at about 110 kV/cm. The fields needed to saturate the $c$ and $a$ components of polarization may be derived from this plot and are about $100/\sqrt{2}$ (i.e., 70 kV/cm) and $150/\sqrt{2}$ (i.e., 106 kV/cm), respectively. FIG. 5 shows clearly that distinct ranges of electric fields are available for polarizing and for optically switching the bismuth titanate film.

Results of optical switching and contrast ratio measurements on a ferroelectric device with an epitaxially grown single domain bismuth titanate film and a set of electrodes oriented at 45° to the $a$ and $c$ axes of the film were also obtained. The electrodes, made of aluminum, were evaporated through a photomask with a gap of 25 microns. The hysteresis loops looked essentially the same as those in FIG. 4. Before $c$ axis switching, the film was poled with an electric field of about 150 kV/cm which poled the $a$ polarization component. The film was oriented with a polarizing microscope, rotating by stages for maximum extinction. The appearance was viewed with monochromatic sodium light at 589 microns under crossed polarizers. The only areas which did not extinguish were some small regions adjacent to the electrode edge, where it was suspected that fringe fields had caused a conversion from $b$ to $a$ perpendicular orientation. Otherwise the film corresponded to what would be expected for a single domain bulk crystal of bismuth titanate.

Results were also obtained with an electric field of about 40 kV/cm, which reversed only the $c$ polarization component. As was expected, light transmission occurred. There were some small dark areas in the gap which resulted not from the film but from particles. The actual on/off contrast ratio was only about 3:1 because of the small non-extinguishing areas. The film was switched between the two states several times with no indication of degradation of the polarization component along the $a$ axis. The film was repoled with a strong field after a long period of switching. It was therefore established that use of the present invention controlled poling and switching of the polarization components of the quadristable ferroelectric single domain bismuth titanate.

To obtain a specific embodiment of the invention, the electrode configuration of FIG. 1 can be employed directly in a device structure. The operational procedure is to apply a sufficiently large field to switch both the $a$ and $c$ components and leave the ferroelectric in a single domain state. Transfer between the "on" and "off" states is achieved by using smaller switching electric fields, reversing only the $c$ component. If device degradation occurs due to $a$ component depolarization, it is necessary then to reapply the large poling field.

A standard ferroelectric optical display can be adapted to the invention as just described. Such device does, however, present certain difficulties. Each element can readily have its own pair of electrodes. However, the "dead" area will be large, being comprised of the electrode areas and the space between adjacent sets of electrodes. It would be more efficient to permit each electrode to switch the material on both sides of it. However, in order to achieve a uniform polarization state a given electrode would have to be positive for the material on one side and negative for that on the other. Thus, a complicated sequence of polarity applied to the electrodes would be required.

The present invention presents an improved operational device. This specifically preferred embodiment of the present invention is shown by reference to FIGS. 6 and 7. Only one module of a matrix array of similarly made modules is shown.

Figure 6:
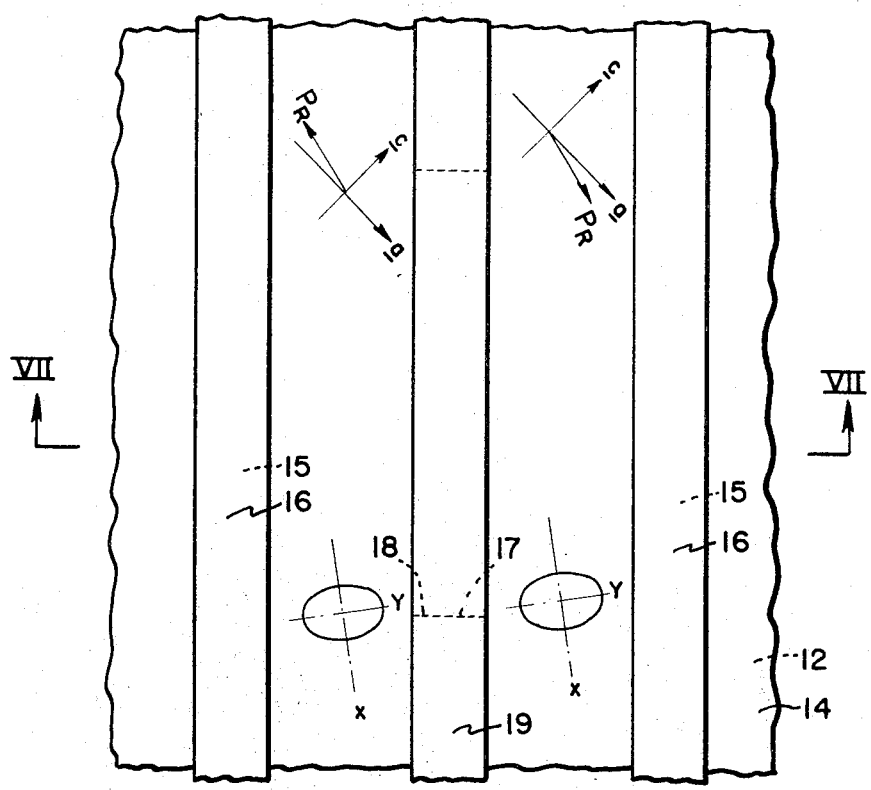
FIG. 6 is a top view of an epitaxially grown bismuth titanate film having an untwinned (010) crystallographic orientation mounted on a (110) oriented spinel crystal substrate with 45° electrodes.
Figure 7:
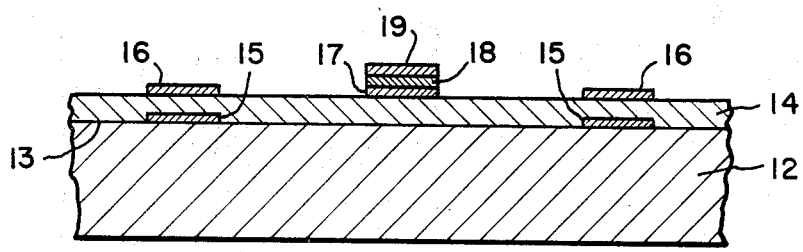
FIG. 7 is a cross-sectional view taken along line VII—VII of FIG. 6.

Referring to FIGS. 6 and 7, substrate 12 is spinel crystal of material such as magnesium aluminate ($MgAl_2O_4$) with planar surface 13 having the (110) crystallographic orientation. Such (110) oriented spinel crystals are commercially available in the cut, lapped and polished condition.

Elongated electrodes 15 of material such as aluminum or gold-titanium are deposited on surface 13 by standard photolithographic masking and vapor or sputter deposition techniques. Electrodes 15 are spaced apart and parallel to each other and are oriented to be at about 45° to the $a$ and $c$ axes of the subsequently grown bismuth titanate film. Thereafter bismuth titanate film 14 is formed on surface 13 and electrodes 15 by epitaxial growth as fully described in our copending U.S. application Ser. No. 279,563 filed Aug. 10, 1972. The space between the electrodes 15 grown in contact with the spinel substrate 12 is an untwinned single domain region in the (010) crystallographic orientation with the $a$ and $c$ crystallographic axes at about 45° to the electrodes 15.

After epitaxial growth of the film 14, elongated electrodes 16 and 17 are simultaneously formed on the film by standard photolithographic masking and vapor or sputter deposition techniques. The electrodes 16 and 17 are parallel to and spaced apart from each other and electrodes 16 are also coincident with electrodes 15 so that all the elongated electrodes are at about 45° to the $a$ and $c$ axes of the film 14. Centrally positioned electrode 17 is however not continuous as are outwardly positioned electrodes 16, but is intermittent as indicated by the dotted lines on FIG. 6.

Photosensitive conductive layer 18 is then formed on intermittent electrode 17 by well-known techniques. Layer 18 is a material such as zinc selenide or cadmium sulfide which electrically conducts when activated by light.

Electrodes 19 are then affixed on layer 18 to form a continuous electrode joining the intermittent centrally positioned electrode 17 and layer 18. Electrode 19 is a light translucent, low resistivity material such as indium tin oxide or semitransparent gold (i.e., gold in a layer of only a few hundred Angstroms).

In operation, the driving potential is continuously applied to electrode 19. To switch the device, a light source is directed onto photosensitive layer 18 through electrode 19, causing layer 18 to electrically conduct and apply the driving potential to electrode 17 and in turn apply the electric fields through bismuth titanate film 14. Two active regions are formed in the film between the electrodes in which the electric fields are in opposite directions as shown by the $P_r$ vectors. The $P_r$ vectors are in different quadrants of the a-c monoclinic plane but are parallel to each other. Further, as shown by FIG. 6, the light polarization axes ($x$ and $y$) in each active region are parallel to the polarization axes in the other active region and are rotated coincidently on switching of the device.

The optical switching is read-out or detected by shining light on the active regions between the electrodes. The light may be confined to the active regions so as not to activate photosensitive layer 18. However, the more preferred way is flood the entire surface with dim light. Such light has sufficient intensity to be detected in the high contrast optical switching, but not of sufficient intensity to activate the photosensitive layer 18.

This specific embodiment of the present invention has particular utility. Poling and switching is effected by addressing the center electrode 17, resulting in a poled structure with opposite polarization directions but common orientations of the index ellipsoid of light polarization. Reversal of the $c$ axis component in the active regions now produces the same tilt in the polarization ellipsoid and thus a cooperative change in optical contrast. Yet, there is minimal "dead" space in the ferroelectric film corresponding to the space occupied by electrodes 15 and 16.

It should be noted that electrodes 15 and 16 collectively define the outwardly positioned electrodes of the set of three electrodes of the present embodiment of the invention. Electrodes 15 and 16 are common in the electrical circuit. The electrodes 15 and 16 are positioned below and above the film 14, respectively, to provide substantially uniform polarization and switching as previously explained.

In summary, the present invention can be used with any ferroelectric material with at least two independently reversible components. In the case of bismuth titanate, the operational switching used the polarization component along the crystallographic $c$ axis, which happened to be the polarization component with a much lower coercive field than the other independently reversible polarization component. However, this is not limiting of the present invention. If, for example, the two coercive fields were more nearly equal, the electrode angle could be changed so that a greater fraction of the applied field would be directed along the desired direction of switching. A similar compensation could be made for any anisotropy in the electrical conductivity. The invention can thus be variously performed within the scope of the following claims.

What is claimed is:

1. A quadristable ferroelectric device comprising:
   a. a ferroelectric material having at least two independently reversible ferroelectric polarization components and single-crystal comains; and
   b. at least one set of electrodes positioned to be capable of applying electric fields through the single-crystal domains of the ferroelectric material at such angle to said reversible polarization components that a first electric field can ferroelectrically polarize both said reversible polarization components and a second electric field can reverse one said reversible polarization component without reversing the other said reversible polarization component.

2. A quadristable ferroelectric device as set forth in claim 1 wherein:
   the ferroelectric material is bismuth titanate.

3. A quadristable ferroelectric device as set forth in claim 2 wherein:
   the set of electrodes apply the electric fields at between about 30° and 60° to the $a$ and $c$ crystallographic axes of the single-crystal domains of the bismuth titanate.

4. A quadristable ferroelectric device as set forth in claim 2 wherein:
   the set of electrodes apply the electric fields at between about 40° and 50° to the $a$ and $c$ crystallographic axes of the single-crystal domains of the bismuth titanate.

5. A quadristable ferroelectric device comprising:
   a. a substrate;
   b. an epitaxially grown bismuth titanate film attached to said substrate having untwinned (010) crystallographically oriented regions;
   c. at least one set of electrodes fastened to the bismuth titanate film to apply electric fields through said film at about between 30° and 60° to the $a$ and $c$ crystallographic axes of said untwinned regions of the bismuth titanate.

6. A quadristable ferroelectric device as set forth in claim 5 wherein:
   the substrate is a (110) crystallographically oriented spinel crystal.

7. A quadristable ferroelectric device as set forth in claim 5 wherein:
   each set of electrodes comprises three electrodes parallel to and spaced apart from each other whereby the electric fields applied through the ferroelectric material are in opposite directions between electrodes of said set of electrodes.

8. A quadristable ferroelectric device as set forth in claim 7 wherein:
   the electric fields applied through the ferroelectric material are at between about 40° and 50° to the $a$ and $c$ crystallographic axes of said untwinned regions of the bismuth titanate.

9. A quadristable ferroelectric device as set forth in claim 7 comprising in addition:
   d. a photosensitive layer attached to the centrally positioned electrode of set of electrodes is capable of electrically conducting when light radiation is incident thereon; and
   e. a translucent electrode attached to the photosensitive layer and capable of applying a potential to said centrally positioned electrode of at least one said set of electrodes when the photosensitive material is light activated.

* * * * *